United States Patent

[11] 3,613,876

| [72] | Inventors | John C. Kohler;<br>Robert C. Sutliff; Corrado Zollo, all of Rochester, N.Y. |
|---|---|---|
| [21] | Appl. No. | 879,161 |
| [22] | Filed | Nov. 24, 1969 |
| [45] | Patented | Oct. 19, 1971 |
| [73] | Assignee | Eastman Kodak Company<br>Rochester, N.Y. |

[54] ANTICLOCKSPRING DEVICE AND METHOD
7 Claims, 3 Drawing Figs.

[52] U.S. Cl. .................................................. 206/52 F,
156/73, 220/DIG. 31, 242/71.1, 242/71.8
[51] Int. Cl. ...................................................... B29c 27/08,
B65d 85/67, B65h 75/18
[50] Field of Search .......................................... 206/52 R,
52 F, 59 C, 58; 220/27, DIG. 31; 242/71.8, 71.1,
55.2, 68.5

[56] References Cited
UNITED STATES PATENTS

| 2,724,867 | 11/1955 | Smith | 220/27 UX |
| 2,864,493 | 12/1958 | Holcombe | 206/52 |
| 2,953,313 | 9/1960 | Csutor | 242/68.5 |
| 3,069,105 | 12/1962 | Press et al. | 242/55.2 |
| 3,144,936 | 8/1964 | Muehlebach et al. | 206/59 C |
| 3,389,872 | 6/1968 | Lyman | 242/71.8 A |

Primary Examiner—William T. Dixson, Jr.
Attorneys—W. O. Hodsdon and R. L. Randall ABSTRACT: In a film cartridge having a core support hub extending through the film core, preventing clock-springing of a roll of film therein providing one or more spotwelds between the surface of the core and the end of the hub which has sufficient strength to prevent the core from rotating during shipping but which will break as the film is withdrawn from the cartridge, permitting the core to rotate. The spotwelds may be formed ultrasonically or by a solvent or adhesive. An alternate embodiment utilizes a paper paster which is glued across the core and the hub and which is torn by the withdrawal of film from the cartridge permitting the core to rotate.

PATENTED OCT 19 1971  3,613,876

JOHN C. KOHLER
ROBERT C. SUTLIFF
CORRADO ZOLLO
INVENTORS

BY *Walter O. Hodsdon*

*Robert L. Randall*
ATTORNEYS 3,613,876

ANTICLOCKSPRING DEVICE AND METHOD

BACKGROUND OF THE INVENTION

The present invention is directed to an anticlockspringing device and method which is applicable to packaging a rolled web product, and more particularly to a package in which a spool of photographic film may be marketed and which protects the film until and while it is placed into a camera. More particularly, the present invention prevents a spool in such a package from rotating during handling and shipping, thereby preventing clockspringing or unwinding of the web or film from the spool with subsequent handling problems and/or damage to the film.

In various film packages or cartridges now in use, the film is wound on a spool or core, with or without flanges, and is disposed within a magazine which totally surrounds the film and protects it from light and other damaging effects. One end of the film is normally secured to the core or spool center and the other end extends out through a slot in the magazine and is fastened to the surface of the cartridge until it is inserted in the camera and the film is threaded. It has been found that there is a tendency for film in such cartridges to unwind during handling and shipping. Inasmuch as the inner end is connected to the core or the spool center and the outer end is secured to the outer surface of the cartridge, the film acts as a clockspring to turn the spool as it unwinds. Such clockspringing can result in scratching of the film surface, causing a deterioration in the quality of the image that may be recorded thereon. In other instances the film can clockspring to the extent that the outer convolutions of film jam against the inner surface of the cartridge making subsequent unreeling of the film difficult or impossible.

Various attempts have been made at providing anticlockspringing devices to prevent unwinding of the film in cartridges. However, most such devices have been costly and have generally added to the weight of the cartridge. Moreover, many such prior art devices had to be removed prior to use of the film, necessitating the opening of the cartridge.

SUMMARY OF THE INVENTION

It is thus apparent that a simple, reliable and economical method of preventing web or film clockspringing in such cartridges is extremely desirable and would significantly minimize the web or film damage and/or subsequent difficulties in removing the web or film from the cartridge without adding to the cost or weight of the cartridge.

Accordingly, the present invention provides a web cartridge having a roll of web or film disposed therein which has a center core. Means is provided for frangibly connecting the core to a portion of the cartridge whereby the core is held substantially stationary by the connection between the core and the cartridge until a tensile force is applied to the end of the web to remove it from the cartridge. The frangible connection between the core and cartridge is so arranged so that it will prevent rotation of the core with respect to the cartridge during handling and shipment of the cartridge and yet a relatively light pull upon the end of the web will rupture the frangible connection and permit the rotation of the core within the cartridge and the withdrawal of the web from the cartridge.

Furthermore, the present invention provides an anticlockspringing device wherein a portion of the cartridge wall adjacent the core is softened and adhered to the core at a plurality of small areas which may be ruptured by a relatively light pull on the end of the film.

More specifically, the small areas are formed by applying an ultrasonically vibrated probe having a plurality of small contact areas to the outer surface of the cartridge and depressing the cartridge wall into contact with the core whereby the core and the cartridge are welded together at a plurality of small frangible areas.

In another embodiment of the present invention, an adhesive-bearing tape is arranged to connect the core to a portion of the cartridge whereby the core is restrained with respect to the cartridge. The tape is arranged to rupture upon a pull on the end of the film, thereby permitting rotation of the core and withdrawal of the film from the cartridge.

More specifically, the present invention provides a method of preventing clockspringing of a roll of film in a cartridge comprising the steps of inserting a roll of film having a central core into an open cartridge, closing the cartridge, deflecting the cartridge wall into contact with the core, applying a probe to the outer surface of the cartridge adjacent the roll core therein, and ultrasonically vibrating the probe to weld the core to the inner wall surface of the cartridge.

Still further, the ultrasonically vibrated probe is provided with a plurality of small area contact surfaces whereby the core is welded to the cartridge wall at a plurality of small frangible spots.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiments of the present invention are illustrated and described.

DESCRIPTION OF THE PREFERRED EMBODIMENT

Figure 1:
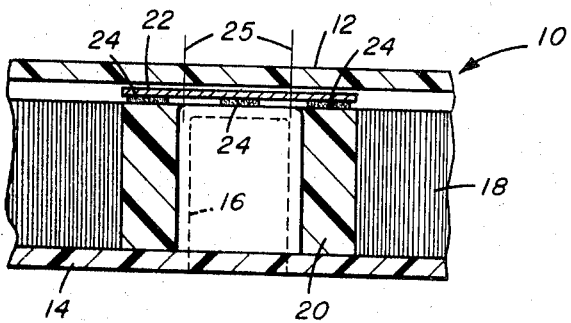
FIG. 1 is a partial cross section through a film cartridge showing a preferred embodiment of the present invention.

A preferred embodiment of the present invention is illustrated in FIG. 1 wherein only the central portion of a film or web-bearing cartridge 10 is shown. The cartridge has an upper and a lower wall member 12 and 14 with a shape substantially similar to the roll product contained therein and is provided with a peripheral wall member, connecting wall members 12 and 14, not shown. The lower wall member 14 is provided with a recessed portion 16 forming a spool hub which locates and supports the roll of film or web material 18 contained in the cartridge. The rolled web or film product 18 is wound upon a central core or spool 20 which has an inner diameter substantially equal to the diameter of hub 16, whereby the rolled product is supported in the cartridge for rotation when the film product is withdrawn. It has been found that such rolled web products, photographic especially photographic film have a tendency to clockspring, or unwind, rotating the core 20 with the resultant disadvantages noted above.

Accordingly, the present invention provides means for frangibly connecting the core 20 to a portion of the cartridge body. In this embodiment, tape member of paster 22, having one or more heat or pressure-sensitive adhesive-bearing portions 24, is adhered to the end of hub 16 and to the corresponding end surface of core 20. The adhesive bearing tape 22 thus prevents the core 20 and the rolled web product 18 from rotating about hub 16 during handling and shipment of the film cartridge. As a result, clockspringing of the web product is prevented. The tape member 22 is selected so that it has a strength sufficient to prevent the rotation of the rolled product during handling and shipment but will break when a relatively light tensile force is applied to the end of the film product, which normally extends out through an opening in the peripheral wall of the cartridge (not shown) to permit threading of the film end thereof to a camera or other apparatus. Thus, when the end of the film is pulled, as in a threading operation, the tape 22 breaks, e.g. at 25, permitting the rotation of the core 20 about hub 16. Alternatively, the adhesive joint between the tape and either the core or the hub may be arranged to release upon the application of a tensile force to the end of the film.

Figure 2:
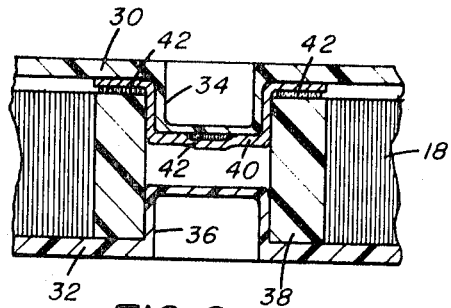
FIG. 2 is a partial cross section through a film cartridge showing an alternate embodiment of the present invention; and 3 is a partial cross section through a film cartridge showing a second alternate embodiment of the present invention.

An alternate embodiment is illustrated in FIG. 2 wherein each wall member of the cartridge, 30 and 32 respectively, is provided with a short, inwardly extending hub portion 34 and 36 which operate to align and support the film core 38. In this embodiment, a tape 40 bearing adhesive 42 on both surfaces thereof frangibly connects the core 38 to the end of hub 34. This tape is likewise arranged to break upon the application of a tensile force to the end of the film. Similarly, a tape bearing adhesive on both sides thereof can be employed in an arrangement similar to that illustrated in FIG. 1 whereby the core 20 is connected by the tape to the inner surface of wall 12.

Figure 3:
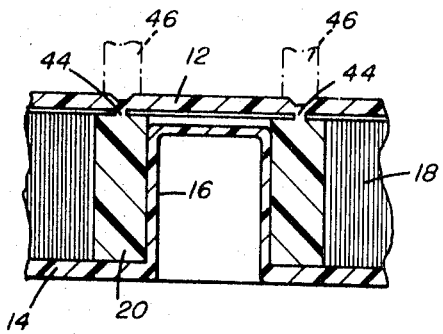

A third embodiment of the present invention is illustrated in FIG. 3 and comprises a cartridge having a configuration substantially similar to that of FIG. 1. In this arrangement like reference numerals are applied to like parts. In this embodiment, the core 20 is restrained from rotation by a plurality of small, frangible welds 44 formed between the end of the core and the inner surface of cartridge wall 12. These welds may be simply and economically formed by application of one or more ultrasonically vibrated probes 46, shown in phantom in this illustration, to the outer surface of wall 12, depressing it into contact with the end of core 20. The ultrasonic vibration of the probe softens the cartridge wall and/or the core material at the interface between the core and the core and the container wall, joining them together. The cross-sectional area of the weld spots is sized such that the rotation of the roll material and the core are prevented during normal handling and shipment, but are broken upon the application of a tensile force to the end of the film, similar to the above-described embodiments. The spotweld size may be controlled by the configuration of the probe or by the formation of raised areas in the cord or cartridge wall. It will be appreciated that the weld spots can also be formed by the use of a solvent that will soften the cartridge wall and/or the core material. Moreover, the weld spots can be formed by the application of a suitable adhesive between the cartridge and the core. Still further, when either the core or the cartridge are formed of certain plastics, a heat weld may be utilized.

It will thus be seen that the present invention provides a simple and inexpensive method and device for preventing the clockspringing of a roll of web material in a cartridge or container. Moreover, the present anticlockspring arrangement does not significantly increase the weight of the package nor does it cause any adverse effects to the film or web product. Furthermore, while the present arrangement successfully prevents the clockspringing of a rolled film or web product during shipment and handling, it does not significantly interfere with the normal usage or supply of the web.

The invention has been described in detail with particular reference to preferred embodiments thereof, but it will be understood that variations and modifications can be effected within the spirit and scope of the invention.

We claim:

1. Means for preventing clockspringing of a wound roll of web material within a cartridge during storage and shipment, said roll of web material including a central core, said core arranged to rotate with said roll of material within said cartridge, said cartridge having at least one wall member disposed substantially contiguous to the edge of said roll, said clockspring prevention means comprising means for frangibly connecting said core to said cartridge wall member, said frangible connection arranged to break when said roll is rotated by a tensile force on the outer end of the web material whereby said roll is freely rotatable in said cartridge after the frangible connection is broken.

2. The invention according to claim 1 wherein said frangible connection means is a portion of the cartridge wall adjacent the core which is softened and adhered to the core at a plurality of small areas which are broken by a relatively small tensile force on the end of the web.

3. The invention according to claim 2 wherein said cartridge wall is ultrasonically welded to said core.

4. The invention according to claim 1 wherein said frangible connection means is an adhesive bearing frangible tape which connects the core to a portion of the cartridge, said tape being arranged to break between the core and the cartridge upon a pull on the end of the web.

5. The invention according to claim 4 wherein said cartridge has a core supporting hub extending through said core with said core being rotatable on said hub, said adhesive bearing tape arranged to connect said core to the end of said hub.

6. A method of preventing clockspringing of a roll of film having a central core in a cartridge having a wall member comprising the steps of deflecting the cartridge wall into contact with the roll core, applying a probe to the outer surface of the cartridge wall adjacent the core in contact therewith, and ultrasonically vibrating the probe to frangibly weld the core to the inner wall surface of the cartridge.

7. The invention according to claim 6 wherein said cartridge wall is deflected into contact with the roll core by said probe.